H. C. WEST.
ELECTRICAL MEASURING INSTRUMENT.
APPLICATION FILED SEPT. 13, 1915.
1,193,096. Patented Aug. 1, 1916.
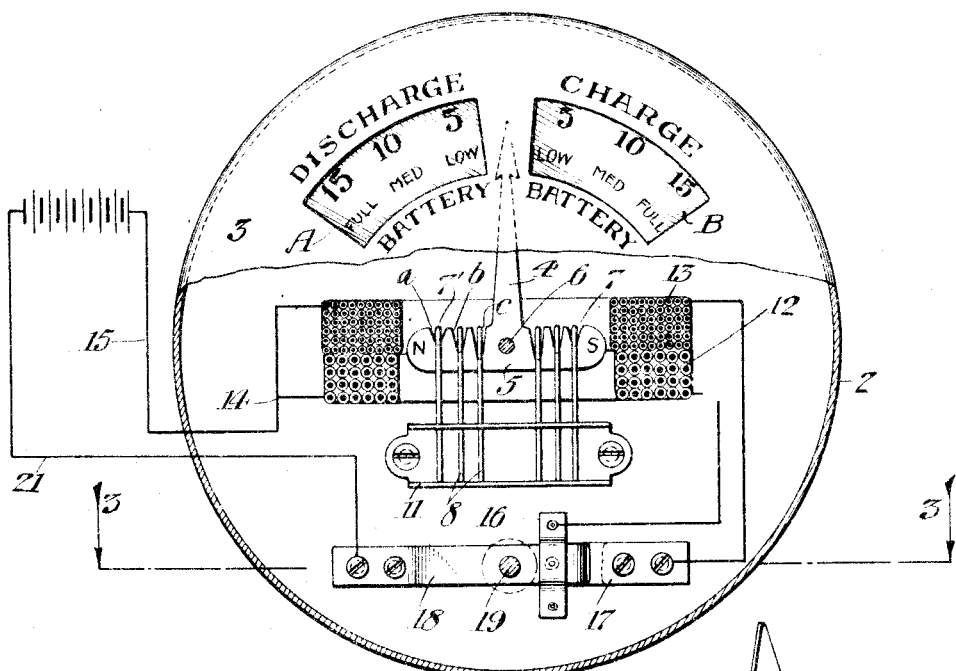
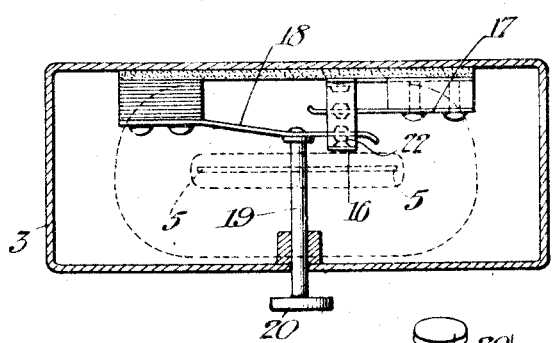
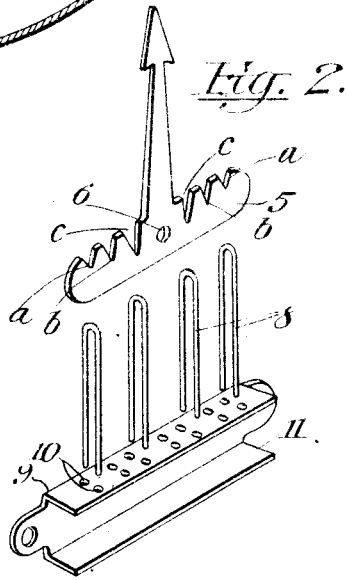
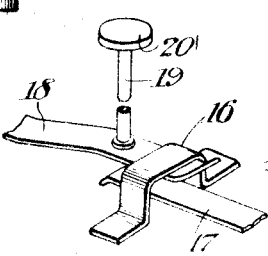
Witnesses: Inventor:
Hubbard C. West.

UNITED STATES PATENT OFFICE.

HUBBARD C. WEST, OF MOUNT VERNON, NEW YORK, ASSIGNOR OF ONE-FOURTH TO DAVID M. BENFORD AND ONE-HALF TO SARAH B. BENFORD, BOTH OF MOUNT VERNON, NEW YORK.

ELECTRICAL MEASURING INSTRUMENT.

1,193,096. Specification of Letters Patent. Patented Aug. 1, 1916.

Application filed September 13, 1915. Serial No. 50,285.

*To all whom it may concern:*

Be it known that I, HUBBARD C. WEST, a citizen of the United States, residing at Mount Vernon, in the county of Westchester and State of New York, have invented certain new and useful Improvements in Electrical Measuring Instruments, of which the following is a specification.

This invention relates to electrical measuring instruments, the object of the invention being to provide an improved instrument which will indicate whether a battery or generator is being charged or discharged and also the condition of the storage battery: that is, whether it is fully charged, or is only partly charged, or is dead, thus doing away with the necessity of using a hydrometer, and which instrument is simple in construction, inexpensive to manufacture and accurate in use.

In the drawings accompanying and forming part of this specification, Figure 1 is a front, partly sectional, view of this improved instrument, with part of the casing removed to show the interior arrangement; Fig. 2 is a perspective view of the indicator and its coöperating members; Fig. 3 is a section taken on line 3—3, Fig. 1, looking in the direction of the arrows in said Fig. 1; and Fig. 4 is a detail view of the push button switch.

Similar characters of reference indicate corresponding parts in the different figures of the drawings.

The instrument, which in the present instance is shown constructed for attachment to the instrument board in the cowl of an automobile, comprises in the preferred form thereof a casing 2 provided with a front face or dial 3 having its upper portion divided into two segments, one, as A, for indicating the discharge and the other, as B, for indicating the charge of the battery or generator. In the casing 2 is located a pointer 4, having connected thereto or formed as a part thereof, at its lower end a bar 5 forming a permanent magnet. This bar and the pointer 4 are shown in the present instance as integrally connected and mounted on a pivot 6 for oscillatory movement. In the upper edge of the bar 5, at each side of the pivot, is formed a series of notches 7 and 7', three being shown at each side in the present instance, these notches being graduated in depth from each end of the bar toward the center thereof; that is to say, the outer notch *a* at each end of the bar is of a predetermined depth, the second notch from each end, as *b*, of greater depth, and the third notch, as *c*, of still greater depth, each succeeding notch on each side of the pivot toward the center of the bar 5 being of greater depth than the preceding one, it being understood that the bar may be of any desired length and the number of notches increased according to requirements. Hanging in each of the notches 7 and 7' is a U-shaped weight 8, six being shown in the present instance. For the purpose of supporting these weights in the normal position a rack 9 is provided, having openings or slots 10 for guiding the ends of the weights 8, the rack having below the same a supporting member 11, whereby the weights are all maintained at the same height when the pointer is at zero.

Surrounding, but spaced from, the magnetic member or bar 5 is a pair of coils 12 and 13, one, as 12, of coarse winding and the other, as 13, of fine winding. At one side of the instrument, as at 14, these two coils are connected together and are also connected with one pole of the battery or generator by a wire 15. In the present instance I have provided a spring switch, and the fine wire coil, or coil 13, is connected with one member, as 17 Fig. 3, of this switch, while the coarse wire coil, or coil 12, is connected with a strap or bridge member 16 of the switch having a contact member 22. The spring switch is provided with a third spring member 18 connected at one end through the wire 21 to the opposite pole of the battery from that to which the wire 15 is connected, and which spring member 18 has connected thereto near its opposite end a plunger 19 having at its outer end a push button 20, the spring member 18 projecting beyond the point of connection with the plunger 19 and overlapping the member 17, but normally out of contact therewith and in contact with the contact member 22 of the bridge or strap member 16, thereby bringing the coarse wound coil 12 into operation, the instrument thus acting normally to show whether the battery is charging or discharging. By pushing the button 20 so as to have the member 19 contact with the member 17 the coil 12 is cut out and the fine wound coil 13 thrown into operation, whereupon the instrument becomes effective to show the voltage, in other words the condition of the battery. That is to say, should the pointer go to the point marked 10 on the dial on either side A or B, according to its position at the time the push button is operated, this would indicate that the battery is in medium condition, or half charged. It is immaterial which way the pointer moves to show this voltage, as this is determined according to the wire that happens to be connected with the positive pole of the battery.

In the operation of the instrument, when the pointer is at its normal position, or midway between the portions A and B of the dial, the weights 8 are all resting on the supporting member 11, but on the movement of the pointer to one side or the other, the outermost weight on the side opposite to the direction of movement will first be picked up, and on the continued movement of the pointer responsive to the increase or decrease of the current the successive weights will be picked up by the bar 5 at that side of the pointer opposite to the direction of movement of such pointer. The present improvement can, therefore, be used not only to show the charge and discharge of the battery, in other words to show not only whether the battery is charging or discharging, but in addition can be used to show whether the battery is fully charged, or is partly charged, or is not charged at all. That is to say, if the instrument is applied to an automobile for instance, when the car is running the pointer will indicate whether the battery is being charged or is discharging, the latter due to short circuit or other cause, and by manipulating the push button switch it will also indicate the condition of the battery, that is whether it is fully charged, or partly charged, or is dead. In short, when the switch is used the instrument takes the place of a hydrometer; so that when the instrument is placed on the dash or instrument board of an automobile the use of a hydrometer may be dispensed with.

From the foregoing it will be seen that I have provided an instrument in which the use of springs and the attendant disadvantages thereof, such as the wabbling of the pointer back and forth, high factory cost in process of manufacture, etc., are entirely eliminated, and when the weights are set they remain always the same.

It will, of course, be understood that the various details of construction may be modified without departing from the spirit and scope of this invention.

I claim as my invention:

1. In an electrical measuring instrument, the combination of means for indicating the charging or discharging of a battery and for indicating the condition of the battery and including a swinging member and a plurality of weights normally free from the swinging member and adapted to be successively picked up by said swinging member.

2. An electrical measuring instrument comprising a supporting member, a magnetic member pivotally mounted thereon, a pair of coils encircling said magnetic member and adapted to be connected in separate circuits to a source of electrical energy, means coöperating with said magnetic member for indicating the charging or discharging of the source of energy and for indicating the condition of said source, means for throwing one of said coils in circuit while cutting out the other, and gravity actuated means for retarding the pivotal movement of said magnetic member and comprising a plurality of members normally free from the magnetic member and adapted to be successively picked up by said magnetic member.

3. An electrical measuring instrument comprising a supporting member, a magnetic member pivotally mounted thereon, a pair of coils encircling said magnetic member and adapted to be connected in separate circuits to a source of electrical energy, means coöperating with said magnetic member for indicating the charging or discharging of the source of energy and for indicating the condition of said source, means for throwing one of said coils in circuit while cutting out the other, and gravity actuated means coöperating with said magnetic member for retarding the pivotal movement of said magnetic member and comprising a plurality of members normally free from the magnetic member and adapted to be successively picked up by said magnetic member.

4. An electrical measuring instrument comprising a supporting member, a magnetic member pivotally mounted thereon, a pair of coils encircling said magnetic member and adapted to be connected in separate circuits to a source of electrical energy, means coöperating with said magnetic member for indicating the charging or discharging of the source of energy and for indicating the condition of said source, a switch for throwing one of said coils in circuit while cutting out the other, and gravity actuated means for retarding the pivotal movement of said magnetic member and comprising a plurality of members normally free from the magnetic member and adapted to be successively picked up by said magnetic member.

5. An electrical measuring instrument comprising a supporting member, a magnetic member pivotally mounted thereon, a pair of coils encircling said magnetic member and adapted to be connected in separate circuits to a source of electrical energy, means coöperating with said magnetic member for indicating the charging or discharging of the source of energy and for indicating the condition of said source, means for throwing one of said coils in circuit while cutting out the other, and two series of weights disposed at opposite sides of the pivotal center of said magnetic member, the weights of each series adapted to be successively operative for retarding the pivotal movement of said member.

6. An electrical measuring instrument comprising a supporting member, a magnetic member pivotally mounted thereon, a pair of coils encircling said magnetic member and adapted to be connected in separate circuits to a source of electrical energy, a pointer adapted for movement with the pivotal movement of said magnetic member, means for throwing one of said coils in circuit while cutting out the other, and gravity actuated means for retarding the pivotal movement of said magnetic member and comprising a plurality of members normally free from the magnetic member and adapted to be successively picked up by said magnetic member.

7. An electrical measuring instrument comprising a supporting member, a magnetic member pivotally mounted thereon, a pair of coils encircling said magnetic member and adapted to be connected in separate circuits to a source of electrical energy, a pointer adapted for movement with the pivotal movement of said magnetic member, means for throwing one of said coils in circuit while cutting out the other, and two series of weights disposed at opposite sides of said pointer, the weight of each series adapted to be successively operative for retarding the pivotal movement of said magnetic member.

8. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, and gravity actuated means at each side of the pivotal center of said magnetic member for retarding the movement of said member and comprising a plurality of members adapted to be cumulatively effective on said movement.

9. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, and a plurality of weights at each side of the pivotal center of said magnetic member and adapted to be successively and cumulatively effective for retarding the movement of said member.

10. An electrical measuring instrument comprising a supporting member, a magnetic member mounted thereon for pivotal movement and carrying a pointer, a pair of coils encircling said magnetic member and adapted to be connected in separate circuits with a source of electrical energy, one of said coils being normally in circuit, means for throwing said coil out of circuit while throwing the other in, and a plurality of weights at each side of the pivotal center of said magnetic member, the weights on each side adapted to be operative successively from the end toward the pivotal center of said magnetic member for retarding the movement of said member.

11. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, a plurality of weights at each side of the pivotal center of said magnetic member for retarding the movement of said member, and means for guiding said weights.

12. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, a plurality of weights at each side of the pivotal center of said magnetic member adapted to be picked up thereby for retarding the movement of said member, and means for normally supporting said weights.

13. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, a plurality of weights at each side of the pivotal center of said magnetic member for retarding the movement of said member, means for guiding said weights, and means for normally supporting said weights.

14. An electrical measuring instrument comprising a supporting member, a magnetic member pivotally mounted thereon and carrying a pointer, a pair of coils encircling said magnetic member and adapted to be connected in separated circuits with a source of electrical energy, one of said coils being normally in circuit,—a switch for throwing said coil out of circuit while throwing the other in, and gravity actuated means at each side of the pivotal center of said magnetic member for retarding the movement of said member and comprising a plurality of members adapted to be successively and cumulatively effective on such movement.

15. An electrical measuring instrument comprising a supporting member, a magnetic member pivotally mounted thereon and carrying a pointer, a pair of coils encircling said magnetic member and adapted to be connected in separate circuits with a source of electrical energy, one of said coils being normally in circuit, means for throwing said coil out of circuit while throwing the other in, gravity actuated means at each side of the pivotal center of said magnetic member and comprising a plurality of members adapted to be successively and cumulatively effective for retarding the movement of said member, and a dial coöperating with said pointer for indicating the charging and discharging of the source of energy and also the condition of said source.

16. In an electrical measuring instrument, the combination of means for indicating the charging or discharging of a battery or generator and including a swinging member, and gravity actuated means comprising a plurality of members normally free from the swinging member and adapted to be successively picked up thereby for retarding the swinging movement of said member.

17. In an electrical measuring instrument, the combination of a supporting member, a magnetic member mounted thereon for swinging movement, a pointer adapted for movement with said magnetic member, a coil encircling said magnetic member and in circuit with a source of electrical energy, and a plurality of weights coöperating with said magnetic member and adapted to be successively and cumulatively effective for retarding the movement thereof, said weights being normally free from the magnetic member and adapted to be successively picked up thereby.

18. In an electrical measuring instrument, the combination of a supporting member, a magnetic member pivotally mounted thereon, a pointer adapted for movement with said magnetic member, a coil encircling said magnetic member and in circuit with a source of electrical energy, and a plurality of weights carried by said magnetic member at each side of its pivotal center for retarding the movement thereof, the weights on each side being operative successively toward such pivotal center.

19. In an electrical measuring instrument, the combination of means for indicating different conditions of a battery and including a movable member and means adapted to be cumulatively effective on said movable member and comprising means supported normally free of connection with said movable member and adapted to be picked up thereby during the movement thereof.

20. In an electrical measuring instrument, the combination of means for indicating different conditions of a battery, one part thereof being automatically operative and the other manually put into operation and including a movable member and means adapted to be cumulatively effective on said movable member and comprising means supported normally free of connection with said movable member and adapted to be picked up thereby during the movement thereof.

21. In an electrical measuring instrument, the combination of means for indicating the charging or discharging of a battery and for indicating the condition of the battery and including a movable member and means adapted to be cumulatively effective on said movable member and comprising means supported normally free of connection with said movable member and adapted to be picked up thereby during the movement thereof.

22. In an electrical measuring instrument, the combination of means for indicating the charging or discharging of a battery and for indicating the condition of the battery, the former automatically operative, and manually controlled means for putting the latter into operation, said indicating means comprising a swinging member and a plurality of members adapted to be cumulatively effective on said swinging member, said plurality of members supported normally free of connection with said swinging member and adapted to be picked up thereby during the movement thereof.

23. In an electrical measuring instrument, the combination of means for indicating the charging or discharging of a battery or generator and including a swinging member, and gravity actuated means for retarding the swinging movement of said member, said gravity actuated means comprising a plurality of successively lifted weights normally free from the swinging member and adapted to be successively engaged thereby.

24. In an electrical measuring instrument, the combination of indicating means, including a movable member, and gravity actuated means for retarding the movement of said member said gravity actuated means including two sets of weights normally free from said movable member and adapted to be successively engaged thereby.

25. In an electrical measuring instrument, the combination of indicating means, means for actuating it and including a swinging member, and successively operative means for retarding the swinging of said member, said last means being normally free from said swinging member and adapted to be brought into operation on the movement of said member.

26. In an electrical measuring instrument, the combination of indicating means and including a swinging member, and gravity actuated means for retarding the swinging of said member, said gravity actuated means including a plurality of successively operated weights normally free from said swinging member and adapted to be brought into operation on the swinging of said member.

27. In an electrical measuring instrument, the combination of indicating means and including a swinging member, gravity actuated means for retarding the swinging of said member, said gravity actuated means including a plurality of successively operated weights normally free from said swinging member and adapted to be brought into operation on the swinging of said member, and means for guiding said weights.

28. In an electrical measuring instrument, the combination of indicating means and including a movable member, gravity actuated means for retarding the movement of said member, said gravity actuated means including two sets of successively operated weights, normally free from said movable member and one set adapted to be brought into operation on the movement of said member in one direction, and means for guiding said weights.

29. In an electrical measuring instrument, the combination of means for indicating the charging or discharging of a battery and for indicating the condition of the battery and including a pivoted swinging member, and two sets of weights located at opposite sides of the pivot, one set of weights being operative on the movement of the pivoted member in one direction while the other set remains inoperative, and vice versa.

30. In an electrical measuring instrument, the combination of means for indicating the charging or discharging of a battery and for indicating the condition of the battery and including a pivoted swinging member, and two sets of weights located at opposite sides of the pivot and in parallelism along said swinging member, one set of weights being operative on the movement of the pivoted member in one direction while the other set remains inoperative, and vice versa.

31. In an electrical measuring instrument, the combination of indicating means including a pivoted pointer, and two sets of gravity-actuated means for retarding the movement of said pointer, each set of gravity-actuated means including a plurality of weights, one set located at each side of said pointer and one set operative when the pointer moves in one direction while the other set remains inoperative and the latter set operative when the pointer moves in the opposite direction while the first set remains inoperative.

Signed at New York, in the county of New York and State of New York, this 9th day of September, 1915.

HUBBARD C. WEST.

Witnesses:
F. E. BOYCE,
TITUS H. IRONS.